(12) United States Patent
Paknad et al.

(10) Patent No.: US 7,792,945 B2
(45) Date of Patent: Sep. 7, 2010

(54) METHOD AND APPARATUS FOR MANAGING THE DISPOSITION OF DATA IN SYSTEMS WHEN DATA IS ON LEGAL HOLD

(75) Inventors: Deidre Paknad, Palo Alto, CA (US);
Pierre Raynaud-Richard, Redwood City, CA (US); Andrey Pogodin, San Mateo, CA (US)

(73) Assignee: PSS Systems, Inc., Mountain View, CA (US)

( * ) Notice: Subject to any disclaimer, the term of this patent is extended or adjusted under 35 U.S.C. 154(b) by 191 days.

(21) Appl. No.: 12/164,524

(22) Filed: Jun. 30, 2008

(65) Prior Publication Data

US 2009/0326969 A1    Dec. 31, 2009

(51) Int. Cl.
*G06F 15/173* (2006.01)
*G06F 12/00* (2006.01)
*G06F 17/30* (2006.01)

(52) U.S. Cl. .................... 709/223; 709/224; 707/200

(58) Field of Classification Search ........................ None
See application file for complete search history.

(56) References Cited

U.S. PATENT DOCUMENTS 5,355,497 A    10/1994   Cohen-Levy
6,330,572 B1 * 12/2001  Sitka ......................... 707/205
7,076,439 B1   7/2006   Jaggi
7,197,716 B2   3/2007   Newell
7,225,249 B1 * 5/2007   Barry et al. .................. 709/227
7,478,096 B2 * 1/2009   Margolus et al. ............... 707/10
7,502,891 B2 * 3/2009   Shachor ...................... 711/137
7,512,636 B2 * 3/2009   Verma et al. ................. 707/200
2002/0010708 A1 1/2002  McIntosh
2002/0083090 A1 6/2002  Jeffrey et al.
2002/0143735 A1 10/2002 Ayi et al.
2003/0004985 A1 1/2003  Kagimasa et al.
2004/0088332 A1 5/2004  Lee et al.
2004/0193703 A1 9/2004  Loewy et al.
2004/0260569 A1 12/2004 Bell et al.
2006/0095421 A1 5/2006  Nagai et al.
2006/0136435 A1 6/2006  Nguyen et al.
2006/0184718 A1 * 8/2006 Sinclair et al. ............... 711/103
2007/0100857 A1 5/2007  DeGrande et al.

* cited by examiner

*Primary Examiner*—Patrice Winder
*Assistant Examiner*—Azizul Choudhury
(74) *Attorney, Agent, or Firm*—Michael A. Glenn; Glenn Patent Group (57) ABSTRACT

This disclosure relates to systems, methods and apparatuses for managing the disposition of data for an event consumer while taking into account whether data has been held from disposition.

37 Claims, 5 Drawing Sheets

```
<onHold>
    <dateRange>
      <start>01/01/2005</start>
      <end>01/01/2006</end>
    <dateRange>
    <custodian>John Smith</custodian>
</onHold>
<onHold>
    <dateRange>
      <start>01/01/2005</start>
      <end>01/01/2006</end>
    <dateRange>
    <dateRange>
      <start>01/01/2007</start>
      <end>01/01/2008</end>
    <dateRange>
    <custodian>Jane Smith</custodian>
</onHold>
<onHold>
    <dateRange>
      <start>01/01/2007</start>
      <end>01/01/2008</end>
    <dateRange>
    <custodian>Pat Rose</custodian>
</onHold>
```

FIG. 4

```
<onHold>
    <dateRange start="01/01/2005" end="01/01/2006">
        <custodian id="123"/>
        <custodian id="345"/>
    </dateRange>
</onHold>
```

FIG. 5A

```
<onHold>
<dateRange>
        <start>01/01/2005</start>
        <end>01/01/2006</end>
<dateRange>
<custodian>John Smith</custodian>
</onHold>
```

FIG. 5B

```
<onHold>
    <dateRange start="01/01/2005" end="01/01/2006"/>
    <custodian id="123">
        <login>uone</login>
        <email>uone@xyz.com</email>
        <customParameter1>EMPL123</customParameter1>
    </custodian>
</onHold>
```

FIG. 6A

```
<map>
<holds>
<onHold>
    <dateRange start="01/01/2005" end="01/01/2006"/>
    <custodian idref="123"/>

<custodian idref="345"/>
</onHold>
</holds>
<custodians>
<custodian id="123">
        <login>uone</login>
        <email>uone@xyz.com</email>
        <customParameter1>EMPL123</customParameter1>
    </custodian>
<custodian id="325">
        <login>utwo</login>
        <email>utwo@xyz.com</email>
        <customParameter1>EMPL325</customParameter1>
    </custodian>
</custodians>
</map>
```

FIG. 6B

METHOD AND APPARATUS FOR MANAGING THE DISPOSITION OF DATA IN SYSTEMS WHEN DATA IS ON LEGAL HOLD

FIELD OF THE INVENTION

The present invention relates to systems for managing the disposition of data when the data is on legal hold. More specifically, the present invention relates to an Information Lifecycle Management Application (ILMA) which manages the disposition of data while taking into account whether data has been held from disposition.

BACKGROUND

Business organizations retain electronic documents, records and other data in storage for extended periods of time for a number of reasons including easy access, internal policy, and regulation compliance, among other various reasons. For instance, organizations may be required to retain electronic records of documents for electronic discovery purposes. Several requirements dictate retention of electronic records including business law, government regulations, bank compliance, tax purposes among others.

Electronic discovery is an increasingly utilized form of information gathering for a variety of purposes. The use of electronic discovery mechanisms in civil litigation, as well as tax, government investigation, and criminal proceedings is becoming essential.

Electronic discovery, also referred to as e-discovery or EDiscovery, concerns deals with information in electronic form. In this context, electronic form is the representation of information as binary numbers. Electronic information is different from paper information because of its intangible form, volume, transience, and persistence. Also, electronic information is usually accompanied by metadata, which is rarely present in paper information. Electronic discovery poses new challenges and opportunities for attorneys, their clients, technical advisors, and the courts, as electronic information is collected, reviewed, and produced. Electronic discovery is the subject of amendments to the Federal Rules of Civil Procedure which are effective Dec. 1, 2006. In particular Rules 16 and 26 are of interest to electronic discovery.

Examples of the types of data included in e-discovery include e-mail, instant messaging chats, Microsoft Office files, accounting databases, CAD/CAM files, Web sites, and any other electronically-stored information which could be relevant evidence in a law suit. Also included in e-discovery is raw data which forensic investigators can review for hidden evidence. The original file format is known as the native format. Litigators may review material from e-discovery in one of several formats: printed paper, native file, or as TIFF images.

Errors in data disposition may result in dire consequences. For instance, in cases where data wasn't disposed of, too much data has been disposed of, or wrong data has been disposed of, an organization may incur unwanted legal and business consequences. Therefore, there is a need to carefully manage data disposition systems.

Therefore, there is a need to develop an Information Technology (IT) infrastructure for managing the disposition of data while taking into account whether data has been held from disposition.

SUMMARY OF THE DISCLOSURE

This disclosure relates to systems, methods and apparatuses for managing the retention and disposition of data in an IT infrastructure while taking into account whether data has been held from disposition. In some embodiments of the present invention, an Information Lifecycle Management Application is disclosed which integrates an e-discovery management application and an enterprise retention management system.

In some embodiments of the present invention, the Information Lifecycle Management Application is configured to manage different types of data sources. In some embodiments of the present invention, the Information Lifecycle Management Application manages hold requests in a variety of ways. In some embodiments of the present invention, the system parameters of the data source are used as the key parameters within a connector.

In some embodiments of the present invention, a data map is constructed to communicate hold requests with disposition requests to a data source. According to these embodiments, the logical expression of the data map is able to be communicated in a variety of formats. According to some embodiments, the data map is used in automatic dispositions. In other embodiments, the data map is used in manual dispositions.

DETAILED DESCRIPTION

Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

Methods and systems for managing electronic discovery and retention-holds are described in Co-pending U.S. patent application Ser. No. 11/963,383 filed on Dec. 21, 2007, entitled "Method and Apparatus For Electronic Data Discovery", which is incorporated herein in its entirety. According to this disclosure, e-discovery collections and hold are performed through an "Electronic Discovery Management Application" (hereinafter referred to as "EMA").

Methods and systems for maintaining an enterprise system for managing the retention schedules of data are described in Co-pending U.S. patent application Ser. No. 12/164,468, filed on Jun. 30, 2008, and entitled "Event Driven Disposition", which is incorporated herein in its entirety. According to this disclosure, retention and disposition is performed through an "Enterprise Retention Management System" (hereinafter referred to as "ERM").

Likewise, methods and systems for managing event driven disposition for data sources with dynamic retention schedules are described in Co-pending U.S. patent application Ser. No. 12/165,085, filed on Jun. 30, 2008, and entitled "Method and Apparatus for Handling Edge-Cases of Event-Driven Disposition", which is incorporated herein in its entirety.

Throughout this disclosure, we will describe "Data Holds", data being "Put on Hold from Retention", "Putting data on Hold". For the purpose of this application, these references to "holds" (as well as other variations) refer to an instruction to overrule any retention disposition process.

According to some embodiments of the present invention, an EMA system and ERM system are closely integrated or fully merged. In the present preferred embodiment of the present invention, an EMA system and an ERM system are merged into a single enterprise Information Lifecycle Management Application (hereinafter "ILMA"). In the present preferred embodiment of the present invention, the ILMA is a computer application stored on a computer readable medium.

Examples of the benefits of integrating the EMA and ERM systems include, but are not limited to:

1. Data put on hold from retention by the EMA should not be disposed of when the ERM sends a disposition request. Therefore the ILMA should be made aware of what data has been put on hold by the EMA.
2. Proper enforcement of retention policies will result in fewer documents that will be subject to an electronic discovery request.

As such, the present invention discloses systems, methods and apparatuses for managing the retention and disposition of data at the enterprise while taking into account whether data has been held from disposition.

Dependency Between Holds and Dispositions

It is beneficial for the EMA and the ERM to be coupled, partially integrated or fully merged into a single ILMA because there is a dependency between the Hold function (legal preservation of data) and the disposition of data.

Many different types of information in the enterprise are subject of retention policies. The policies are defined through Retention Schedules. Although, the definition of a retention schedule can be broader, for the purpose of this discussion let's define it as a rule telling how long (retention period) a document (record, piece of information) should be retained in the data source, what the triggering event type is after which the retention period starts, and what needs to be done when the retention period is reached. Examples of retention schedules are: "the document must be DELETED 5 YEARS after EMPLOYEE TERMINATION" or "the document must be ARCHIVED 30 DAYS after DOCUMENT CREATION".

When there is a need to preserve a document for the purpose of litigation, the document can be "PUT ON HOLD", i.e. preserved inside the data source. When documents are on hold, users of the data source should not be able to change or delete document and their metadata. Note that the same document can be put on "Holds" multiple times if the document is considered potential evidence in multiple legal matters. This means that the document cannot be deleted until all the holds referring to this document are released.

When the document which is a subject to retention policy is put on hold, the retention policy is superseded by the legal hold. Once the legal hold is released, the document becomes once again subject to its standard retention policy. Note that in this context, the words "document", "data", "record", "file" and "information" are used interchangeably.

Information Lifecycle Management Application

Figure 1:
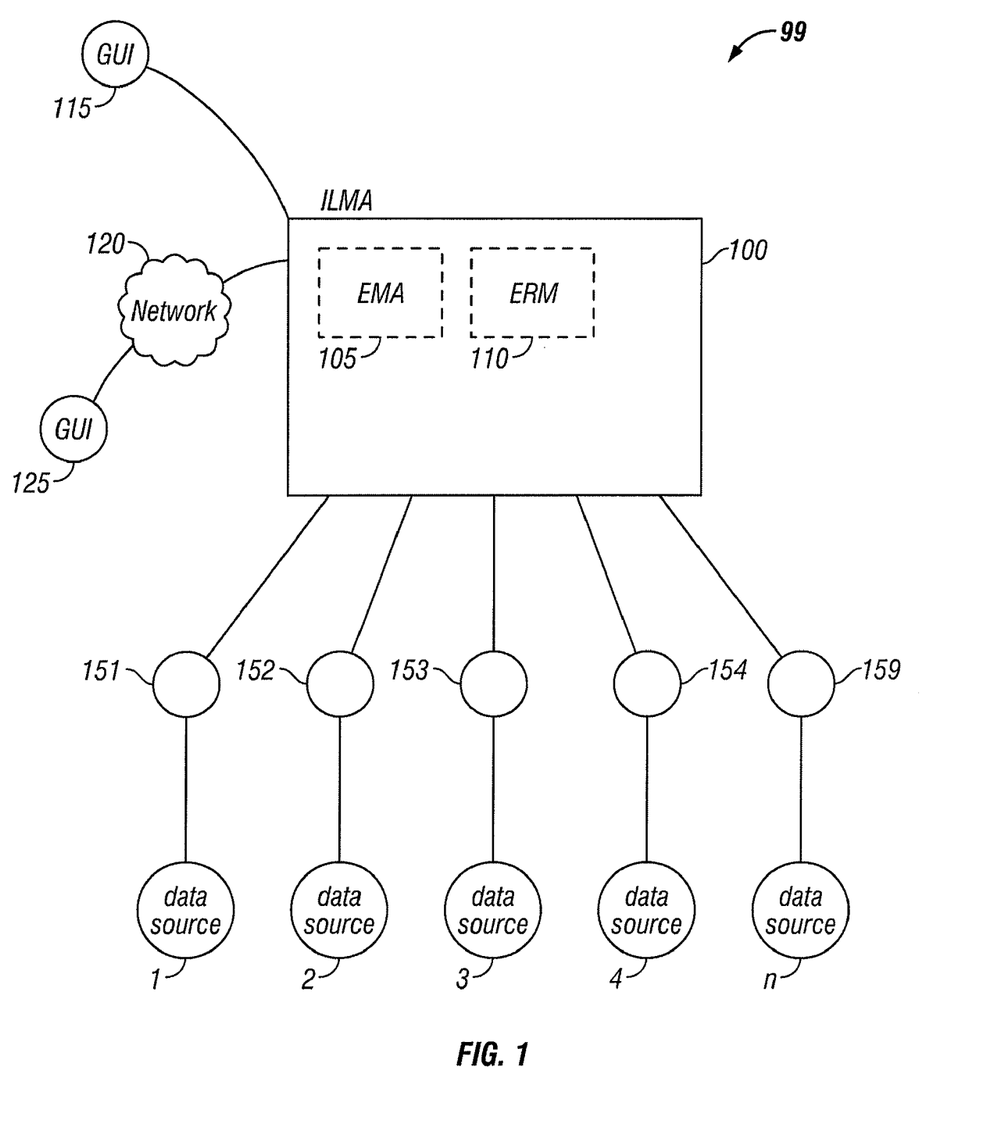
FIG. 1 illustrates a basic schematic diagram of an enterprise level Information Lifecycle Management Application integrating an e-discovery management application and an enterprise retention manager according to some embodiments of the present invention.

FIG. 1 illustrates an IT infrastructure 99 utilizing an ILMA 100 according to some embodiments of the present invention. In the present preferred embodiment of the present invention, the ILMA 100 is an enterprise level application which fully merges an EMA 105 and an ERM 110. In some embodiments of the present invention, the ILMA 100 is interfaced by a user through a Graphical User Interface 115 coupled directly to the ILMA 100. In some embodiments of the present invention, the ILMA 100 is interfaced via a Graphical User Interface 125 coupled to the ILMA 100 via a network 120.

The EMA 105 and the ERM 110 interact with data found in one or more data sources identified as data source1, data source 2, data source 3, data source 4, ... data source n. In the present preferred embodiment of the present invention, the data sources 1, 2, 3, 4, ... n are coupled to the ILMA 100 via connectors 151, 152, 153, 154 and 159.

The process of enforcing holds and disposition requests often depends on the type of data source. Data source type dictates what functions must be performed by the ILMA or the connector. Common types of information sources are disclosed below.

Types of Data Sources

To facilitate compliance with the dependency between holds and disposition of data, the ILMA utilizes connectors to communicate with the data sources. A variety of data sources are categorized into one of the following categories when it comes to their support of hold and disposition through ILMA:

1. Hold-capable by Design Data Source. Holds and dispositions are performed through a connector, and the connector uses underlying data source's fully featured hold capability. Note that the data source itself should be capable of putting documents on multiple holds. This should be the case of most ECM (Enterprise Content Management) applications with full featured retention policy management (like Documentum with the optional Retention Policy Services (RPS) installed and the connector that uses RPS built-in hold functionality to perform a hold). In this scenario, the data source will prevent the connector or any other clients who bypass the connector from disposing of the files on hold. There is no need for ERM or the connector to know what documents are on hold in order to initiate disposition. The application itself will take care of preserving the files on hold. In fact, for such data sources, the connector is just one of many clients who can perform holds and dispositions by leveraging the built-in capabilities of the data source.

2. Connector-Reliant Data Source. Holds and dispositions are performed through a connector which implements its own hold algorithm INTERNAL TO THE CONNECTOR. The data source itself cannot properly support multiple holds without a connector. This will often be the case of a standard ECM application without fully featured support for retention policy management (like a bare bones Documentum application). In that case, the connector performs a hold through locking a file and creating a link between a hold request record and a document record in a connector's database. The connector will unlock the file when number of links between the document and hold requests becomes zero. Let's call such an algorithm "lock and count references".

In this scenario the connector knows what documents are on what hold and will prevent disposition of documents on hold when a disposition request comes through the connector. Also, in this scenario, ERM doesn't need to know which documents are on which hold when disposition is performed through a connector. A connector itself will take care of preserving the files on hold.

If there is a need to perform a disposition bypassing the connector, the client who performs the disposition should know what documents are on hold. Otherwise there is a risk of deleting the documents that are on hold.

There is also a possibility that somebody will put documents on hold bypassing the connector by using some other hold mechanism. For example by locking all the files that match certain criteria and recording it in unstructured fashion into an EMA as a manual hold transaction. If that happened, connector will no longer have ALL information about holds in this data source.

3. Hybrid Data Source. The data source is capable of managing its own holds but hold is always performed outside the connector.

4. Manual-Hold Data Source. Hold is performed manually, and the data source is not capable of supporting multiple holds, or even enforcing any kind of hold automatically at all. The example of such a system is the one which doesn't support any locking mechanism at all. When a steward puts data on hold, she logs the fact into EMA. When the steward needs to perform a disposition, it consults EMA on whether a particular document can be deleted by looking at all holds outstanding for this data source.

In this scenario some other system must be able to tell the user whether the document belongs to any hold or whether it can be subject for disposition. Otherwise disposition is impossible. However, note that this "some other system" is not expected to remember the list of files that have been put on hold because: 1. In many cases it will be hard to produce such a list (file systems don't have reporting capabilities), and 2. Very often the number of files put on hold is huge. If we decide to maintain this information in ILMA, the database will end up storing billions of records. Instead, it will remember only hold criteria such as who the files belongs to and file creation/modification date range.

Types of Hold Requests in the ILMA

As explained above, hold requests are delivered to a data source from the ILMA. These hold requests may take the following form:

1. Unstructured requests, when the instructions on what documents to put on hold are sent to a human, who will interpret these instructions and perform a hold. After a hold is performed, the user will indicate such performance to ILMA by updating the status of the hold request. Usually unstructured request are issued in a form of a Hold Notice, an email message targeted to a person executing the hold (a Steward).
2. Structured manual requests. The lifecycle of a structured request contains two stages. On the Authoring stage a human user is presented a form with fillable fields for parameters such as date range, list of custodians (people whose document are being put on hold), keywords etc. The human user fills the form based on an instruction. On the Execution stage another user sees the parameter values entered by the author and performs the hold accordingly. Due to the fact that parameters are stored in a structured way in the database, the ILMA can read these parameters and make automated decisions based on them. Once user executed the request, she will change the status indicating that request is executed.
3. Automatic requests. They are always structured since the connector needs to understand query parameters. Once the connector, with the help of the automatic request execution framework on ILMA side, executes the request, its status will be changed to indicate that the request has been executed. As with structured manual requests, ILMA can read request parameters and make automated decisions based on them.

Performing Data Disposition

According to the present invention, the disposition of data is performed on data sources as explained above. In the case of the Hold-capable by Design Data Source and the Hybrid Data Source, automatic disposition is simple because the data sources are capable of managing their own holds. As such, it is enough to send a scheduled or immediate disposition request to the data sources, wherein the data sources are able to automatically prevent files on hold from being deleted.

When the data sources are not hold-capable by design, it is more complicated to perform data disposition in a robust fashion while taking into account data on hold. Therefore, it is an object of the present invention to identify a number of parameters a data source to facilitate understanding between a data source lacking hold by design capability for the process of disposition of data and a connector. Presented within is a description of the disposition/retention policies using one or more parameters.

Query Parameters

Various data sources require different sets of query parameters to identify the data targeted for a disposition request or a hold. More discussion regarding query parameters is found within Co-pending U.S. patent application Ser. No. 11/963,383 filed on Dec. 21, 2007, entitled "Method and Apparatus For Electronic Data Discovery"

Like the various data sources, connectors too are able to understand various parameters, but cannot understand others. Two types of parameters include "System Parameters" and "Data Source-Specific Parameters".

System Parameters

Parameters defined in a structured request may or may not be "understood" by ILMA. In the present preferred embodiment of the present invention, the ILMA understands at least a number of "system parameters" Examples of system parameters that are understood by the ILMA according to some embodiments of the present invention include:

1. Custodian Parameters. According to some embodiments, the ILMA can make sense of "Custodian" parameter telling both ILMA and the connector what particular Person the hold is performed against. In ILMA, the value of this parameter will point to a certain record in its data table of custodians. In the connector this parameter may point to some value understood by the Connector/Data Source, for example a Windows user account that owns files in file shares.
2. Creation/Modification Parameters. In some embodiments of the present invention, "Creation/Modification Parameters" are understood by the ILMA. Such parameters are "Document created or last updated date range" which consists of start and end dates between which the documents should have been created or updated in order to qualify for a hold. It is easy for ILMA to analyze such information and make decisions. For example "Documents that don't belong to any date range specified in any outstanding hold are subject to normal retention policy".

3. Retention Category. In some embodiments of the present invention, a "Retention schedule ID" is understood by the ERM part of ILMA, the connector and/or the data source. Note that here and after we will use the term "retention schedule id" in a broad sense. This can be a real id of a retention schedule or an id of a subset of a retention schedule such as "document type" when multiple types of documents are assigned the same retention schedule or any superset of retention schedule such as a record class.

Data Source-Specific Parameters

Data Source-Specific Parameters are types of parameters that can be understood by a connector or a data source, but cannot be analyzed by ILMA or are unnecessarily hard to analyze. Some examples of Data Source-Specific Parameters include, but are not limited to:

1. "Employment status". This parameter is very specific to HR Management System.
2. "Search expression". In a connector that uses a sophisticated search engine, the search engine may define its own search expression language. For example the expression "PSS~5 Systems" may mean "Find all documents where the word 'PSS' is located no farther than 5 words to the left from the word 'Systems'. The search is case sensitive". ILMA doesn't understand such an expression. For example it cannot come out with a counter-expression "Find all documents when the word 'PSS' is NOT located no farther than in 5 words to the left from the word 'Systems'. The search is case sensitive".
3. "Keywords" parameter, which is a list of comma separated keywords. Although this parameter seems to be easily understandable by ILMA, in reality it is not. For example some connectors or underlying search engines will require a keyword to be a part of a word in a document; others will require that the whole word in a document matches the keyword. Or in case of contextual search, the connector will also find the documents containing synonyms of keywords. As a result, ILMA cannot easily make logical decisions based on the value of this parameter.

Key Parameters

It is an object of the present invention to design an Enterprise ILMA such that the ILMA defines a set of "Key Parameters types" that is understood by both the ILMA and a data source.

In some embodiments of the present invention, the same data source may require different sets of query parameters (different query templates) to perform a hold. Manual structured hold requests and automatic hold requests against the same data source can use different query parameters. Moreover, it is very likely that if both manual and automatic holds were applied to the data source, the parameters will be different, because a user is likely to perform a manual hold when the connector doesn't provide proper automatic capabilities. As a result, parameters defined by the user in a manual hold request are likely not to be understood by the connector even if the hold is performed against the same data source. In order for a connector to make any decisions on what data has been put on hold manually, the connector needs to understand the semantic meaning of at least some major parameters used in manual structured hold requests against the data source.

To understand key parameters it is helpful to analyze how they are declared and mapped inside ILMA.

Suppose the Event Consumer data source is a Customer Relationship Management System, for which the most important properties of the data are document created/last updated date range and customer ID. Different manual and automatic hold query templates may introduce other parameters but those two are common across all the templates.

However, each template knows these two parameters under different IDs. For example, for an automatic template T1 "date range" parameter is known as a parameter with ID="PARAM00023", whereas for a manual template T4 the date range parameter is known as "DATE_RANGE_1".

To create a data map, ILMA needs to understand that PARAM00023 and DATE_RANGE_1 refer to the same data. In order to achieve this ILMA:

defines a key parameter type "document date range"
    when a manual template T4 is setup in ILMA, Administrator maps the parameter "DATE_RANGE_1" to the type "document date range"
    after an automatic template T1 is reported to ILMA by the Connector, the Administrator maps the parameter PARAM00023 to "document date range"

Now ILMA has enough information to understand that PARAM00023 and DATE_RANGE_1 is essentially the same thing. Thus when it creates the data map (described below) it queries parameter values DATE_RANGE_1 and PARAM00023 to get the date ranges of documents on hold.

Therefore, it is an object of the present invention to design an Enterprise ILMA such that a set of "Key Parameters types" is defined. It is another object to design an ILMA system using connectors, wherein both manual hold templates and automatic hold templates are able to map the query parameters defined in the template to these key parameters types. It is another object to design an enterprise ILMA that is able to produce a Data Map (see more on Data maps below) for a given Data Source using its key parameters types. (Note that in order to achieve that, ILMA doesn't need to understand semantic meaning of these parameters in full. It just needs to understand their type (date range, vs. number, vs. string). Furthermore, it is an object of the present invention to design a system wherein the connectors are able to interpret a Data Map that is based on values of Key Parameters.

Using System Parameters as Key Parameters

Majority of hold requests in real life specify only date range and custodian plus some non-standard data source-specific parameters. They could have included retention schedules, but automated retention management has not gained its popularity yet, and very few systems are retention-schedule enabled.

This means that for the majority of real life data sources System parameters (document created/last updated date range, custodians, and schedules) and Key parameters are the same thing. This significantly simplifies the design of ILMA application giving ILMA's ability to understand Key parameters for a majority of data sources.

Use of a Data Map in Disposition of Data

As explained above, the automatic disposition of data for Enterprise-Ready Data Sources and Hybrid Data Sources is relatively simple because it is enough to send a scheduled or immediate disposition request to the data sources, wherein the data sources are able to automatically prevent files on hold from being deleted. However, it is more complicated to prevent held files from being deleted in Connector-Reliant Data Sources and Manual-Hold Data Sources because some files may have been put on hold by bypassing the connector.

Connector-Reliant Data Sources

In the situation when some files are put on hold bypassing the connector, we must prevent the Connector from physically deleting these files. To achieve that, connector must receive the information from somewhere, which describes what files were put on hold bypassing the connector so it does not try to delete them when executing a disposition request.

Manual-Hold Data Sources

When performing a manual disposition, user needs to understand what files are still on hold so he/she knows what files need to be preserved. To release files from a hold, the user needs to know what belong to a current hold but not to any other outstanding hold. So that if after a Hold A is released but the file still belongs to Hold B, the file remains protected from enforcement of the retention policy.

Defining What Files are on Hold

From the analysis above, we conclude that in Connector-Reliant Data Sources (with outstanding manual holds) and Manual-Hold Data Sources there is a need for an end user or the connector to understand what files are on hold.

The method described below assumes that ILMA stores information about all hold requests enforced against a given data source regardless of whether these were unstructured hold notices, structured manual hold requests or automatic hold transactions.

In some embodiments of the present invention, a data map is provided to allow an end user to understand what documents can be disposed of. According to these embodiments, a human user is able to understand what data can be manually disposed of. Likewise, a connector is able to understand what documents are put on hold and what files are able to be disposed of.

Defining the Data Map

As explained above, a data map may be utilized to allow an end user to understand what documents can be disposed of manually and to allow a connector to understand what documents are put on hold (thus cannot be disposed of) in the data source.

It is an object of the present invention to represent all the documents residing in a data source within a multi dimensional space where each dimension is a query parameter. In the present preferred embodiment, the dimensions correlate to the key parameters common to the data source, the connector and the ILMA.

Figure 2:
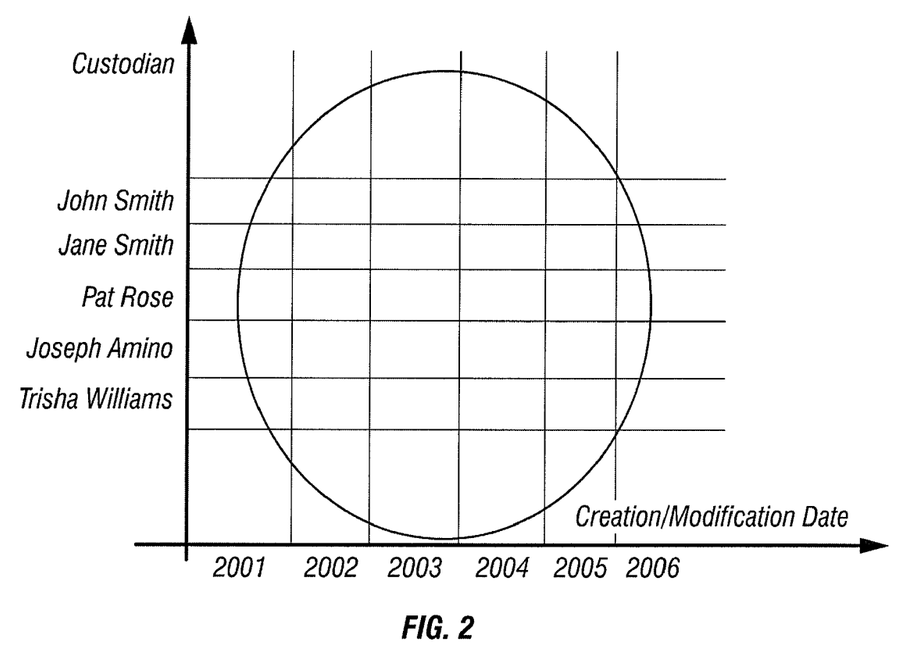
FIG. 2 illustrates a graphical representation of a data map having two query parameters according to some embodiments of the present invention.

FIG. 2 illustrates a graphical representation of a data map having two query parameters (date range and custodians) this will be a 2-dimensional space where one axis is "Custodians" and another axis is "Creation/modification date". When a hold is being applied to a certain set of documents, certain areas located within the data map are tagged, or marked. According to FIG. 2, the data source contains data about five employees: John Smith, Jane Smith, Pat Rose, Joseph Amino and Trisha Williams. Likewise, the data source contains information on the creation and modification of documents spanning the years of 2001 through 2006.

Figure 3:
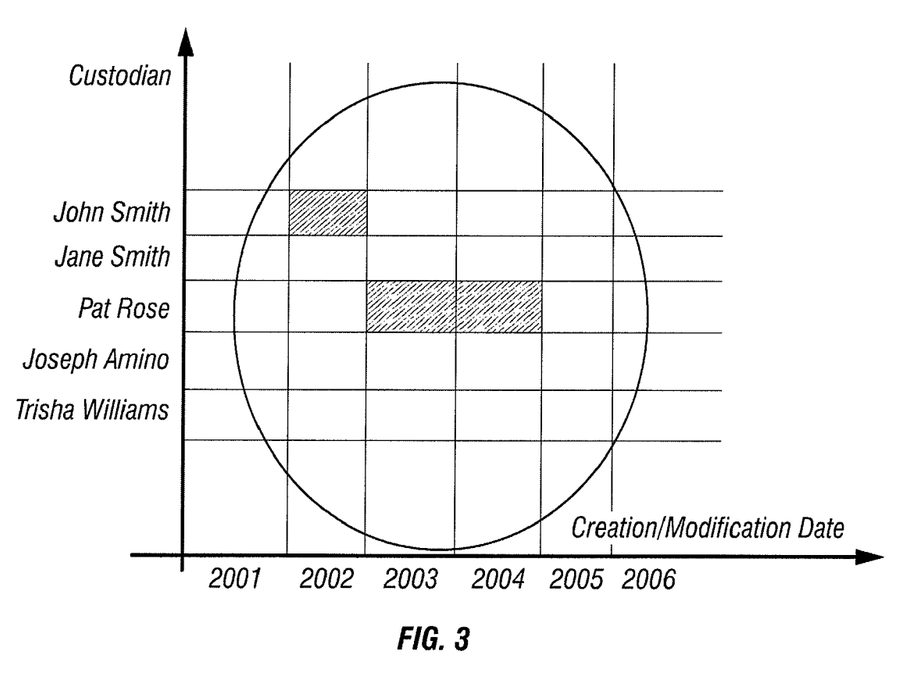
FIG. 3 illustrates a graphical representation of a data map having two query parameters and a portion of the map marked to represent document types put "on hold" according to some embodiments of the present invention.

FIG. 3 illustrates a graphical representation of a data map having two query parameters and a portion of the map marked to represent document types put "on hold". According to FIG. 3, the following documents are on hold: documents owned by John Smith and created/modified in 2002; and documents owned by Pat Rose and created/modified in 2003 and 2004.

The rest of the documents are not on hold and are subjects to standard retention policy. According to the present invention, the ILMA can calculate the document space that is limited to Key Parameters since it cannot interpret the rest of parameters.

FIGS. 2 and 3 illustrate graphical representations of data maps, however, in general, a data map is a structured document generated by the ILMA that describes the data source's document space in a readable form. The data map defines parts of document space/pieces of data that are on hold according to the information stored and understood by the ILMA. In some embodiments of the present invention, the data map is delivered in a human readable format. In some embodiments, the data map is delivered as a .pdf file. In some other embodiments of the present invention, the data map is delivered in machine-readable format. In some embodiments, the data map is delivered as a .xml file.

As an illustrative example, suppose Data source A has more than one outstanding hold requests against it. First, hold request 1 instructs the ILMA to hold files belonging to custodians John Smith and Jane Smith within a date range of Jan. 1, 2005 through Jan. 1, 2006. Next, hold request 2 instructs the ILMA to hold files belonging to custodian John Smith within the date range Jan. 1, 2005 through Jun. 1, 2005. Finally, hold request 3 instructs the ILMA to hold files belonging to custodians Pat Rose and Jane Smith within the data range Jan. 1, 2007 through Jan. 1, 2008.

According to the present invention, there are a number of different ways to express a data map. In some embodiments of the present invention, an optimized format is utilized such that if more than one hold is applied to a certain subset of data, this subset is mentioned only once.

Figure 4:
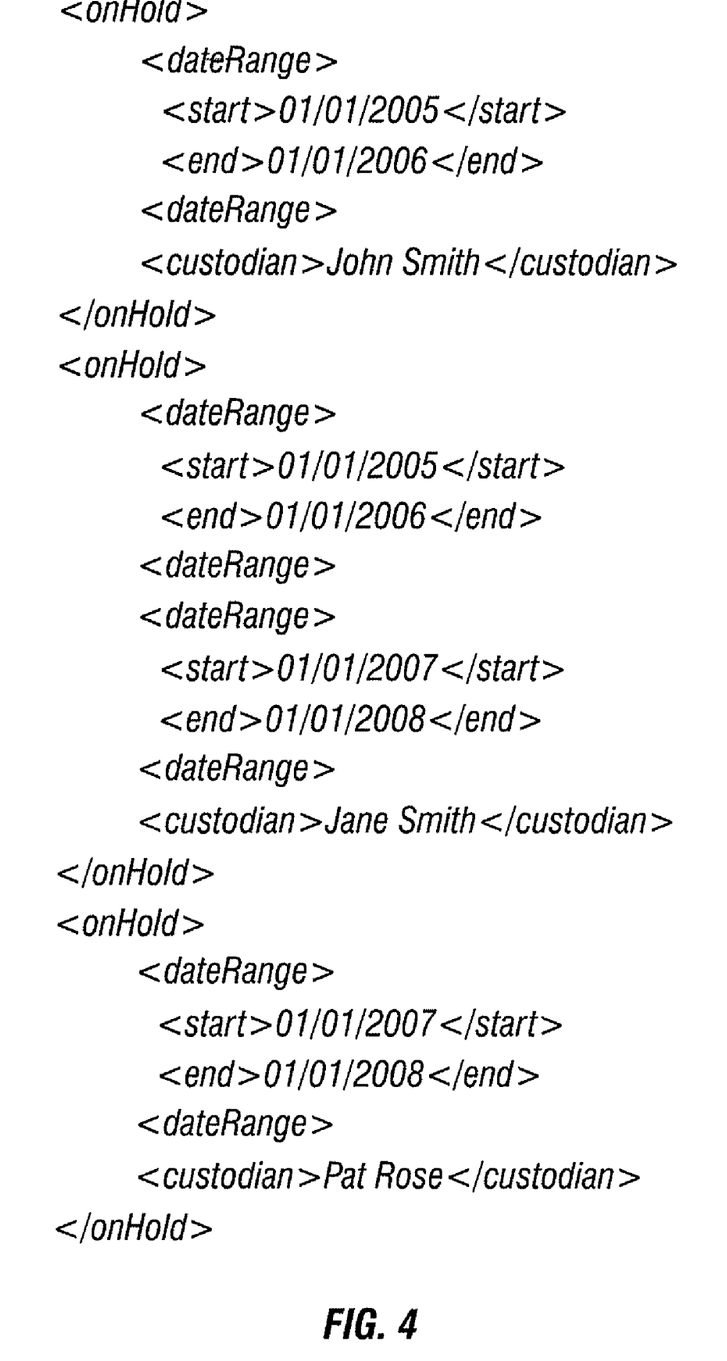
FIG. 4 illustrates an example of an expression of data map in an optimized format representing more than one outstanding hold requests against a data source according to some embodiments of the present invention.

FIG. 4 illustrates an example of an expression of a data map in an optimized format representing more than one outstanding hold requests against a data source, as explained in the example above. Note that the documents collected against John Smith in the second hold request (Jan. 1, 2005 through Jun. 1, 2005) are a subset of the documents collected against John Smith in the first Hold Request (Jan. 1, 2005 through Jan. 1, 2006), therefore the second request is not included into the map.

In some other embodiments of the present invention, the data is presented in a Non-optimized format, such that the data map may define the same subset of documents more than once. According to these embodiments, the format is easier to produce but harder to interpret on user or connector side.

In yet other embodiments of the present invention, a data map is provided to initially group data by different criteria. For example: custodian→dateRange vs. date range→custodian.

Using Key Parameters to Ensure Communication

As explained above, it is preferred that the key parameters established for communication between the data source and the connector and the connector and the ILMA are System Parameters. It is observed that a great majority of applications utilize the same parameters. For instance, an owner parameter and a date range parameter are commonly assigned to data files.

In some embodiments of the present invention, the data map contains only key parameters to ensure that the connector can interpret the Data Map. This scheme is particularly useful when considering that manual structured hold requests and automatic hold requests against the same data source often use different query parameters. In this case, it is very likely that if both manual and automatic holds were applied to the data source, the parameters will be different, because a user is likely to perform a manual hold when the connector doesn't provide proper automatic capabilities.

As a result, parameters defined by the user in a manual hold request are likely not to be understood by the connector. Therefore, if we send such parameters inside a Data Map, connector will not be able to interpret these parameters. Using only key parameters will ensure that the connector can interpret the Data Map during disposition requests.

As a result, some other constraining parameters (such as keywords) will be ignored. According to this setup, the disposition will result in conservative estimate of disposable documents where some documents (that didn't match keywords) are considered non-disposable whereas in reality they don't belong to any holds.

In some embodiments of the present invention, data maps produced for human consumption may also contain custom parameters put together in un-structured fashion. According to these embodiments, the data maps are useful because humans are able to interpret the meaning of textual instructions.

In some other embodiments of the present invention, data maps produced for human consumption may also contain unstructured information from unstructured hold requests because human can interpret the meaning of textual instructions.

In the embodiments explained above, the parameters sent from the connector to the data source are key parameters to ensure communication. Likewise, in order for the ILMA to produce a useful data map, all hold requests from a user should be associated with request parameters sent from the ILMA to the connector. In the present preferred embodiment, the request parameters are key parameters, as defined above.

Flexible Structured Data Maps

In some embodiments of the present invention, the ILMA sends a hold request to a connector. For example, the following hold request may be entered: "Hold data corresponding Jan. 1, 2005 through Jan. 1, 2006 for John Smith and Jane Smith."

Figure 5A:
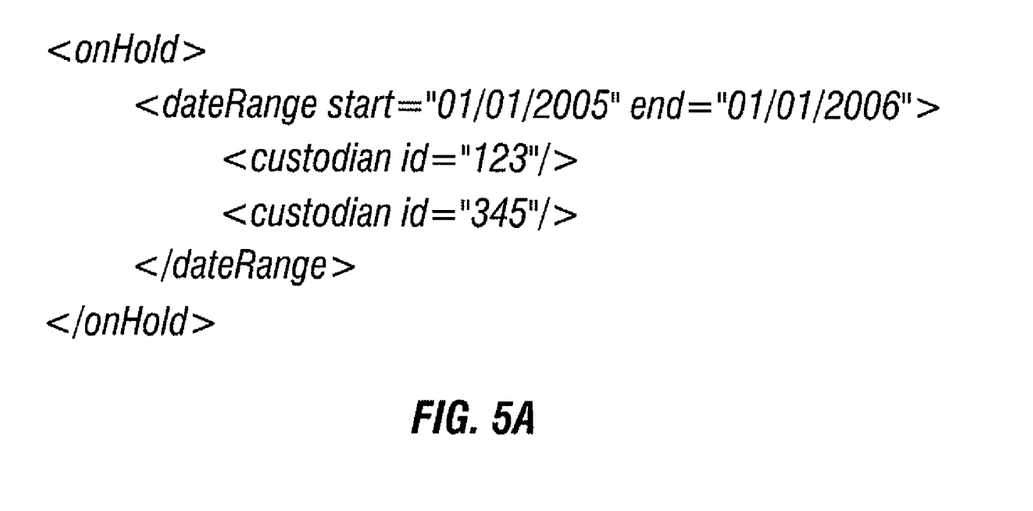
FIG. 5a illustrates an interpretation of the hold request translated into a logical expression of a datamap according to some embodiments of the present invention.
Figure 5B:
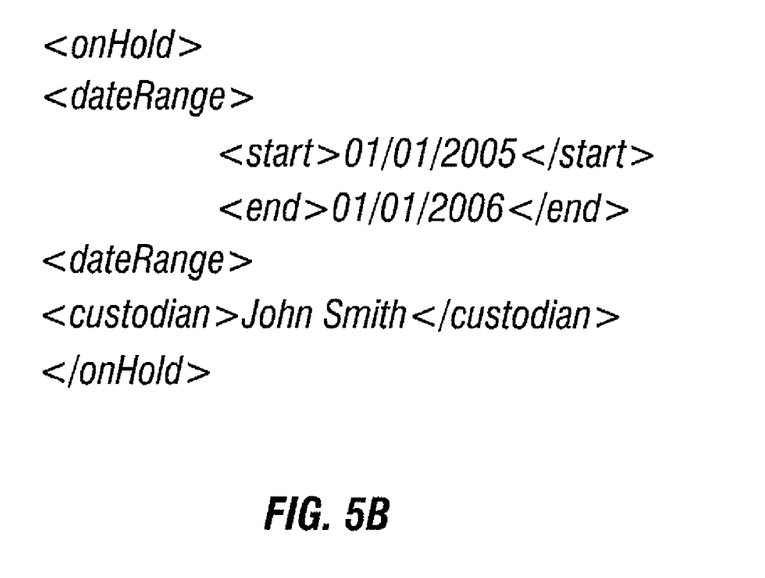
FIG. 5b illustrates a flexible expression of a data map according to some embodiments of the present invention.

FIG. 5a illustrates one possible interpretation of the hold request translated into a logical expression of a datamap. This data map assumes that there will always be dateRange and custodian parameter. However, this may not be true for certain data sources. Therefore such a format is inflexible towards the nature of the data source. As such, in some embodiments of the present invention, a flexible format containing all binding parameters on the same level is presented, so if any of the parameters is missing, this doesn't change the data map significantly. FIG. 5b illustrates a flexible expression of a data map according to some embodiments of the present invention.

Denormalized Verses Normalized Formats

Different data sources can make sense of different attributes of a custodian. For example, email archive applications identify a custodian by an email address. HRMS applications identify a custodian by a Global Corporate ID, etc. It would be too complicated for ILMA to understand what custodian parameter needs to be passed to the data source connector inside the data map. Therefore, ILMA must put all the identifiers of the custodian into the data map. According to some embodiments of the present invention, a denormalized format is utilized when custodian information is repeated each time the document refers to a custodian. According to some other embodiments of the present invention, a normalized format is utilized when custodian records are defined once in a separate block of a document, and all the references to the custodian point to these records.

Figure 6A:
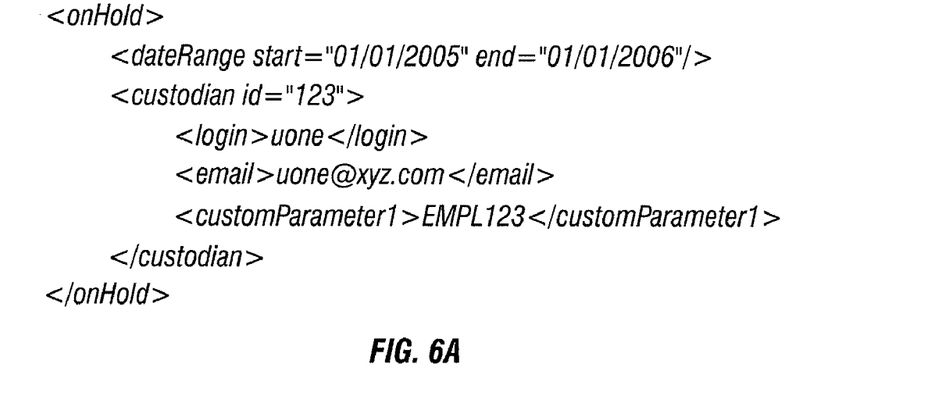
FIG. 6A illustrates a denormalized format of a data map for a given hold request according to some embodiments of the present invention.
Figure 6B:
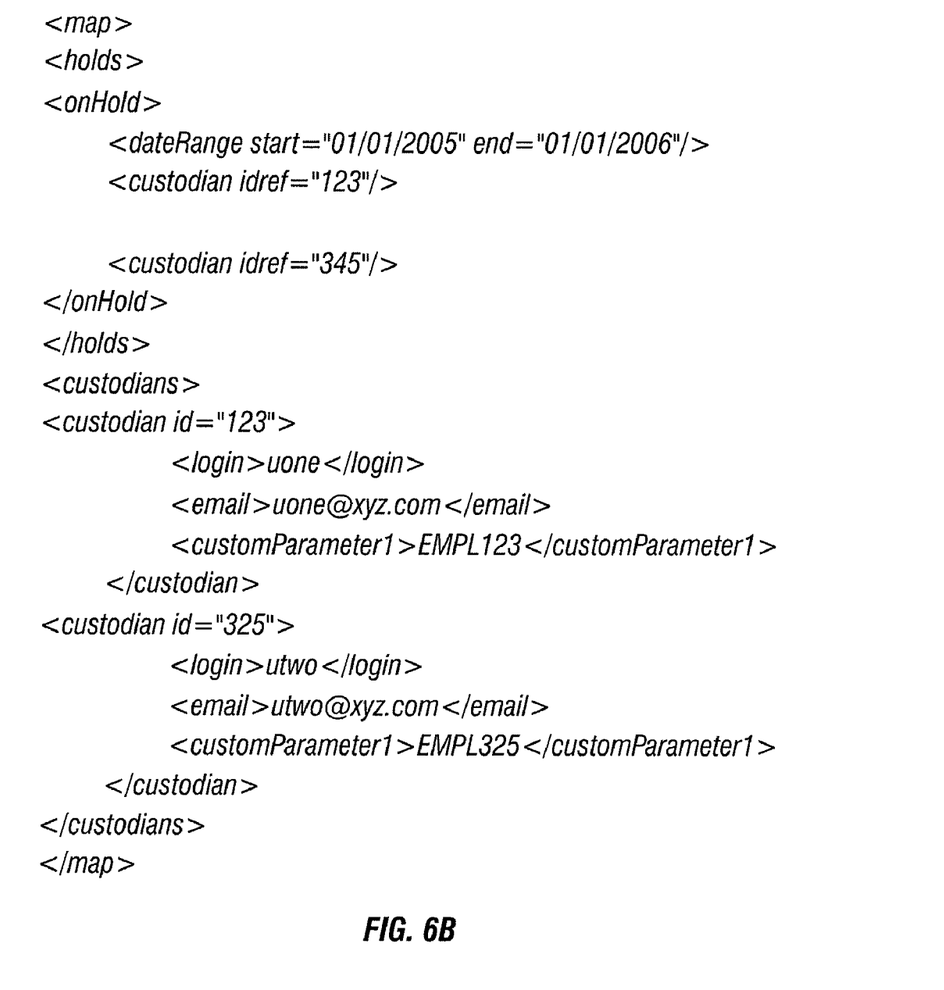
FIG. 6B illustrates a normalized format of a data map for a given hold request according to some embodiments of the present invention.

FIG. 6A illustrates a denormalized format of a data map for a given hold request. According to FIG. 6A, custodian information is repeated each time the document refers to a custodian. Likewise, FIG. 6B illustrates a normalized format of a data map for a given hold request. According to FIG. 6B, custodian records are defined once in a separate block of a document.

Use of Data Map in Automatic Dispositions

There are a number of ways to utilize a data map to effectuate automatic disposal of data in a data source.

In some embodiments of the present invention, a Data Map is sent to the connector as an argument of a Disposition Request. This will allow the connector not to delete the files that were put on hold bypassing the connector.

In some embodiments of the present invention, a Data Map sent to the connector may not contain information about hold transactions that are performed through this connector. According to these embodiments, information does not need to be communicated twice because connector already knows this information.

In some embodiments of the present invention, an ILMA may choose to send a Data Map as an argument in a disposition request only when it knows that there is outstanding hold transactions performed against this data source outside the connector. Otherwise the connector knows all information about data on hold, and doesn't need a Data Map.

In some embodiments of the present invention, a Data Map can be produced in a human-readable form, for a human to consult the Map while performing manual disposition.

In some embodiments of the present invention, a stand-alone application is utilized which is not connected with ILMA. According to these embodiments, the stand-alone application is able to consume the Data Map generated by ILMA and perform disposition against a data source. In this case the Data Map is produced in a machine-readable form.

In some embodiments of the present invention, "Disposition capability" information may be setup on a data source level (either through configuration service response, or through a data source user interface). Based on the value of this setting, ILMA will or will not pass a data map argument inside a Disposition Request event when there are outstanding manual hold requests against this data source. For type Disposition-capable by Design Data Sources, this information is not needed since underlying data source will always ensure safe disposition.

Use of Data Map for Manual Dispositions

In some embodiments of the present invention, a data map is produced for the purpose of manual disposition so a human operator can refer to the map when deciding whether one or another document can be disposed of.

Use of Data Map for Manual Hold Release

In the situation when a data source doesn't support multiple holds, and user should change permissions or checkout a document in order to preserve it, there should be a way to understand which files need to be unlocked during hold release and which ones need to stay locked because they are referred to by another hold transaction.

To achieve that, user can request ILMA to produce a "Data Map Minus One" report that shows what documents are still on hold assuming that this particular hold is already released.

Based on this report, user will not release the documents that are supposed to be on hold after the current hold is released.

Alternatively, the report can describe what files that belong to this particular hold transaction can become a subject to normal disposition because no other hold transactions affect these files.

Disposition-Safety

As explained above, a conservative approach is utilized by using key parameters when constructing a data map. Conservative estimate is possible only when all key parameters are constraining factors in a search criteria/algorithm used to identify files on hold. This is true for the following example:

SELECT ALL WHERE
(keywords like X)
AND
(start date>=A AND end date<=B); because date range system parameter is applied on top of keyword criteria. So any files that fulfill the overall condition must fulfill the system parameter condition However, is not true in the following example:

SELECT ALL WHERE
(keywords like X)
OR
(start date>=A AND end date<=B)

because a date range system parameter doesn't restrict the keywords criteria; there is a chance of finding a file that matches the keyword criteria but doesn't belong to the date range.

As a result, if we create a "conservative" Data Map for the data put on hold using the latter criteria/algorithm, and the data map uses only date range, the connector (or user) will mistakenly dispose of the files that match the keyword criteria but reside outside the date range.

According to some embodiments of the present invention, only disposition-safe templates are used for manual structured hold transactions if we want to dispose of data in Connector-Reliant Data Sources with existing hold transactions that bypassed the connector. Otherwise ILMA won't be able to create a correct Data Map.

According to some embodiments of the present invention, any query template definition should specify if it's disposition-safe or not (which can be done through a user interface, or through a configuration file or through a response to a Configuration Service request).

According to some embodiments of the present invention, when a user tries to use a disposition-unsafe template in a hold request, ILMA should warn the user that it will not be able to perform automated disposition until such a request is released.

According to some embodiments of the present invention, when a user tries to create a Data Map based on a data source that has an outstanding disposition-unsafe hold, ILMA should warn a user that some request resulted in a disposition unsafe preservation, and provide detail information in a form of additional parameters used for a disposition-unsafe hold.

Integration Between ERM and EMA

In some embodiments of the present invention, the ERM and EMA are merged together into a single application, thus ERM can easily query hold information from EMA. In real life such design would most likely be implemented as a single monolithic ILMA application sitting on top of a common database. Also, it was assumed that hold and disposition connectors are merged into a single connector application.

However, such a design, although it is very efficient, is not the only option. There are other application configurations that enable similar functionality.

In some embodiments of the present invention, a configuration is utilized where EMA and ERM are independent applications. Both are configured to work with the same connector. ERM sends disposition requests to a connector as described in Co-pending U.S. patent application Ser. No. 12/164,468, filed on Jun. 30, 2008, and entitled "Event Driven Disposition". In addition, the Connector receives Data Map from EMA. The information may be received the following ways:

1. Push from EMA to connector, when EMA initiates the communication each time disposition map gets updated on EMA side.
2. Pull from connector to EMA, when connector initiates the communication each time it needs to act on a disposition request.

In some other embodiments of the present invention, a configuration is utilized wherein Hold and Disposition connectors are independent applications and they don't share hold data.

In yet other embodiments of the present invention, a configuration is utilized wherein the ERM and EMA and Hold and Disposition Connectors are all independent applications.

The invention in its multiple embodiments define efficient and reliable ways of achieving document disposition in non-ideal situations when both manual and automatic holds can be applied to the data source and data source doesn't have a reliable built-in functionality that support multiple legal holds. According to the present invention, there is a possibility for automating the disposition for a broader range of data sources that were not designed with legal hold and disposition in mind.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

What is claimed is:

1. A computer implemented method of managing the retention of data, comprising:

providing at least one data source having data stored therein, wherein the data is associated with a plurality of parameters, and wherein the retention of the data within the data source is defined in a retention schedule by default rules relating to conditions for retention;

providing an Information Lifecycle Management Application (ILMA) on a computer readable medium, the ILMA comprising:

an E-Discovery Management Application (EMA); and an Enterprise Retention Management (ERM) application for managing disposition requests;

providing at least one connector comprising an interface between the ILMA and the at least one data source;

receiving at least one hold request through the ILMA, wherein the hold request identifies a portion of the data within the at least one data source that must be preserved;

executing the at least one hold request, forming held data, wherein held data is exempted from default rules defined by said retention schedule;

creating at least one data disposition request for the ILMA, wherein the data disposition request identifies a portion of the data within the at least one data source to be deleted;

resolving the disposition request with the held data, forming a resolved request, wherein the resolved request comprises an instruction to dispose of the portion of data identified in the data disposition request minus the held data; and executing the resolved request, thereby deleting the portion of data identified in the data disposition request minus the held data.

2. The method of claim 1, wherein the EMA includes a user interface with a structured template for creating hold requests for the at least one data source, and wherein the step of creating at least one hold request for the ILMA further comprises:

completing the at least one hold request at the ILMA via a structured template available to a user.

3. The method of claim 1, further comprising the steps of:

identifying types of key parameters for at least one data source; and associating parameters defined inside query templates with said key parameters.

4. The method of claim 3, further comprising:

providing a user interface coupled to the ILMA;

providing a configuration application to the user to achieve a configuration step, wherein the key parameters are defined by a user during a configuration step.

5. The method of claim 4, wherein the configuration application is stored in the ILMA.

6. The method of claim 4, wherein the configuration application is stored on a module coupled to the ILMA.

7. The method of claim 3, wherein the key parameters are chosen from among common system parameters used by the data source.

8. The method of claim 4, wherein the key parameters are chosen from among custodian parameters, creation/modification parameters, and retention schedule parameters.

9. The method of claim 3, further comprising the steps of:

constructing a data map, wherein the data map comprises a representation of the data defined by outstanding hold requests within the data source organized by key parameters.

10. The method of claim 9, wherein at least a portion of the data in data source is subject to more than one hold request, forming repeated data hold requests, and wherein the step constructing a data map comprises constructing the data map in an optimized format, such that repeated data hold requests are only represented once in the data map.

11. The method of claim 9, wherein at least a portion of the data in data source is subject to more than one hold request, forming repeated data hold requests, and wherein the step constructing a data map comprises constructing the data map in an non-optimized format, such that repeated data hold requests are represented more than once in the data map.

12. The method of claim 3, wherein the hold request is represented in terms of the key parameters of the at least one data source.

13. The method of claim 12, the hold request is represented in terms of common system parameters.

14. The method of claim 13, wherein the common system parameters are chosen from among custodian parameters, creation/modification parameters, and document identification parameters.

15. The method of claim 2, wherein the structured template available to the user for defining a hold request includes fillable fields relating to key parameters of the at least one data source.

16. The method of claim 15, wherein the structured template available to the user for defining a hold request includes fillable fields relating to common system parameters.

17. The method of claim 16, wherein the common system parameters are chosen from among custodian parameters, creation/modification parameters, and document identification parameters.

18. The method of claim 9, wherein the step constructing a data map comprises constructing the data map in a flexible format such that the reference to a first key parameter is independent from the reference to an additional key parameter.

19. The method of claim 9, wherein the step of constructing a data map further comprises representing the data with additional custom parameters.

20. The method of claim 9, wherein the data map includes more than one attribute for a custodian such that the data map format is understood by more than one data source.

21. The method of claim 20, wherein the data map's presented in a normalized format wherein the custodian record information is transmitted only once.

22. The method of claim 20, wherein the data map is presented in a de-normalized format, wherein the custodian record for the same custodian may be transmitted more than once.

23. The method of claim 9, wherein the data map is used in the automatic disposition of data.

24. The method of claim 23, wherein the at least one data source is not capable of managing its own retention schedule, the method further comprising sending the datamap to the at least one connector, wherein the steps of executing the at least one hold request and resolving the disposition request are performed within the at least one connector, forming a simple delete instruction, and wherein the step executing the resolved request comprises the sending the simple delete instruction to the data source.

25. The method of claim 23, wherein the at least one data source receives a hold request from an outside source, thus bypassing the at least one connector, the method further comprising sending the datamap to the at least one data source along with the disposition request such that the disposition request is able to be executed without deleting the data put on hold from an outside source.

26. The method of claim 23, wherein the ILMA manages the data source retention schedule, and wherein the steps of executing the at least one hold request and resolving the disposition request are performed within the ILMA, thereby identifying a portion of the data within the data source to be deleted, and wherein the step of executing the resolved request comprises transmitting a simple delete instruction to the at least one data source instructing the data source to delete portion of the data within the data source to be deleted.

27. The method of claim 9, wherein the data map is produced in human-readable form and wherein the steps of executing the at least one hold request, resolving the disposition request and executing the resolved request are performed manually by a human user.

28. The method of claim 9, wherein the data map is stored in a computer readable medium for use in a third-party application that is able to consume the data map.

29. An Information Lifecycle Management apparatus comprising:
- a computer network comprising at least one data source coupled to a central computer running an Information Lifecycle Management Application (ILMA), the at least one data source having data stored therein, wherein the data is associated with a plurality of parameters, and wherein the retention of the data within the data source is defined in a retention schedule by default rules relating to conditions for retention, and wherein the ILMA comprises:
  - an E-Discovery Management Application (EMA); and
  - an Enterprise Retention Management (ERM) application for managing disposition requests;
- at least one connector comprising an interface between the ILMA and the at least one data source;
- a means for receiving at least one hold request through the ILMA, wherein the hold request identifies a portion of the data within the at least one data source that must be preserved;
- a means for executing the at least one hold request, forming held data, wherein held data is not subjected the default rules relating to conditions for retention;
- a means for creating at least one data disposition request for the ILMA, wherein the data disposition request identifies a portion of the data within the at least one data source to be deleted;
- a means for resolving the disposition request with the held data, forming a resolved request, wherein the resolved request comprises an instruction to dispose the portion of data identified in the data disposition request minus the held data; and
- a means for executing the resolved request, thereby deleting the portion of data identified in the data disposition request minus the held data.

30. The Information Lifecycle Management apparatus of claim 29, wherein the EMA includes a user interface with a structured template for creating hold requests for the at least one data source, and wherein the means for creating at least one hold request for the ILMA further comprises sending the at least one hold request to the ILMA via a structured template available to a user.

31. The Information Lifecycle Management apparatus of claim 29 further comprising:
- a user interface coupled to the ILMA; and
- a configuration application available to a user via the user interface, wherein the configuration application provides a means for defining key parameters of the data source that are understood by the ILMA.

32. The Information Lifecycle Management apparatus of claim 31, wherein the configuration application is stored in the ILMA.

33. The Information Lifecycle Management apparatus of claim 31, wherein the configuration application is stored on a module coupled to the ILMA.

34. The Information Lifecycle Management apparatus of claim 31, further comprising:
- a means for constructing a data map, wherein the data map comprises a representation of the data within the data source organized by key parameters; and
- a means for translating the hold request such that the hold request is represented in terms of key parameters.

35. The Information Lifecycle Management apparatus of claim 31, wherein the structured template available to the user for defining a hold request includes fillable fields relating to key parameters of the at least one data source.

36. The Information Lifecycle Management apparatus of claim 31, wherein the structured template available to the user for defining a hold request includes fillable fields relating to common system parameters.

37. The Information Lifecycle Management apparatus of claim 36, wherein the common system parameters are chosen from among custodian parameters, creation/modification parameters, and document identification parameters.

* * * * *